(12) United States Patent
Luckey et al.

(10) Patent No.: US 9,368,268 B2
(45) Date of Patent: Jun. 14, 2016

(54) UNDERFLOOR TRANSFORMER

(71) Applicant: ABB Technology AG, Zürich (CH)

(72) Inventors: Michael Luckey, Marsberg (DE);
Marcos Bockholt, Paderborn (DE);
Benjamin Weber, Winterberg (DE);
Wolfgang Mönig, Brilon (DE)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 13/670,128

(22) Filed: Nov. 6, 2012

(65) Prior Publication Data

US 2013/0113589 A1 May 9, 2013

(30) Foreign Application Priority Data

Nov. 8, 2011 (EP) .................................. 11008877

(51) Int. Cl.
*H01F 27/06* (2006.01)
*H01F 27/08* (2006.01)
*H01F 27/26* (2006.01)
*H01F 27/10* (2006.01)
*H01F 27/24* (2006.01)

(52) U.S. Cl.
CPC ................ *H01F 27/06* (2013.01); *H01F 27/26* (2013.01); *B60L 2200/26* (2013.01)

(58) Field of Classification Search
CPC ......... H01F 27/06; H01F 27/26; H01F 27/10; H01F 27/16; H01F 27/245; H01F 27/2455; H01F 27/30; H01F 27/303; H01F 27/306; H01F 27/323; H01F 3/04; B60L 2200/26
USPC ............. 336/68, 184, 210, 212, 219, 100, 90, 336/179, 57
See application file for complete search history.

(56) References Cited

U.S. PATENT DOCUMENTS

| | | | | |
|---|---|---|---|---|
| 2,898,564 A | * | 8/1959 | Terry, Jr. | 336/197 |
| 2,906,977 A | * | 9/1959 | Rowley et al. | 336/68 |
| 3,195,082 A | * | 7/1965 | Wetherill et al. | 336/12 |
| 3,436,707 A | * | 4/1969 | Andersen et al. | 336/134 |
| 4,345,232 A | * | 8/1982 | DeLaurentis | 336/210 |

(Continued)

FOREIGN PATENT DOCUMENTS

| | | |
|---|---|---|
| EP | 2 040 273 A1 | 3/2009 |
| EP | 2 157 005 A1 | 2/2010 |
| GB | 740572 A * | 11/1955 |
| JP | 5-013243 A | 1/1993 |

(Continued)

OTHER PUBLICATIONS

European Search Report issued Jun. 13, 2012 by the European Patent Office in corresponding European Patent Application No. 11008877.0.

*Primary Examiner* — Mangtin Lian
(74) *Attorney, Agent, or Firm* — Buchanan Ingersoll & Rooney PC

(57) ABSTRACT

An underfloor transformer includes a layered transformer core and at least one electrical winding through which the transformer core extends along a limb axis. In each of two axial end regions of the transformer core, a securing device, which interacts with the transformer core mechanically, is provided. The securing devices are configured for such tensile force stressing. The underfloor transformer can be carried suspended therefrom.

20 Claims, 3 Drawing Sheets

(56) References Cited

U.S. PATENT DOCUMENTS

| | | | | |
|---|---|---|---|---|
| 5,092,027 | A | * | 3/1992 | Denner .................. 29/607 |
| 5,596,305 | A | * | 1/1997 | Puri ..................... 336/205 |
| 2011/0254647 | A1 | * | 10/2011 | Bacarisse ............ H01F 27/025 336/92 |
| 2012/0013427 | A1 | * | 1/2012 | Noda et al. ................ 336/57 |

FOREIGN PATENT DOCUMENTS

| | | |
|---|---|---|
| JP | 9-134823 A | 5/1997 |
| JP | 2002-170724 A | 6/2002 |
| JP | 2003-163122 A | 6/2003 |
| JP | 2008-117898 A | 5/2008 |
| WO | WO 2010/150345 A1 * | 12/2010 |

* cited by examiner

UNDERFLOOR TRANSFORMER

RELATED APPLICATIONS

This application claims priority under 35 U.S.C. §119 to European Patent Application No. 11008877.0 filed in Europe on Nov. 8, 2011, the entire content of which is hereby incorporated by reference in its entirety.

FIELD

The present disclosure relates to an underfloor transformer including a layered transformer core and at least one electrical winding through which the transformer core extends along a limb axis.

BACKGROUND INFORMATION

It is known that corresponding line-bound supply networks are available for transmitting electrical energy. Depending on the electrical power which is to be transmitted, the supply networks have a rated voltage of, for example, 380 kV, 110 kV or else 10 kV, wherein a network frequency of 50 or 60 Hz may be used. A supply network for supplying fixed consumers may be constructed in 3 phases, and therefore a system with three supply lines is available. In the symmetrical state of the lines of this system, the current and voltage are equal in absolute value given a phase shift of 120° in relation to each other in each case.

Energy supply systems for mobile consumers such as, for example, railways or trams may be constructed with a single phase, for example, the supply is provided via an individual supply line, with the feedback then occurring via the metallic rail. In the case of overhead line buses, two supply lines are provided due to the absence of a rail which can be used as a return conductor. The network frequency in such applications is, for example, in Europe, 16 2/3, 25, 50 or 60 Hertz, and in some cases, such as in trams, direct voltage may be occasionally used.

In order to transform the typical alternating supply voltage from 10 kV to 15 KV, mobile transformers are provided which are then integrated, for example, into the underfloor region of a passenger train.

Owing to the underfloor arrangement, the mobile transformers only have a very limited space available, particularly with respect to the height and are usually embodied as oil transformers. On the one hand, the oil serves here as a coolant for conducting away the waste heat which is produced during operation, and as an insulating means, by which small insulating distances, and therefore a compact design, can be implemented.

However, it is disadvantageous for mechanical reasons that such a transformer can usually only be arranged in a stationary fashion, that is to say with a limb axis which is oriented perpendicularly, but this does not correspond to the flat space available in the underfloor region. In addition, for safety reasons, oil, as a combustible medium, is to be avoided in the means of transportation if possible. A lying arrangement uses the space available significantly better but mechanical problems occur with the compressive loading of the winding which is then in a lying position and via which the core weight is transmitted. Embodiment variants with dry transformers are also known, which transformers are, however, also arranged in a standing position due to the problems of compressive loading of the windings, in which case increased cooling also has to be ensured owing to the absence of oil.

SUMMARY

An exemplary embodiment of the present disclosure provides an underfloor transformer which includes a layered transformer core having two axial end regions, and at least one electrical winding through which the transformer core extends along a limb axis. In addition, the exemplary underfloor transformer includes securing devices each respectively provided in a corresponding one of each of the two axial end regions of the transformer core. The securing devices are configured to interact mechanically with the transformer core, and are configured for tensile force stressing such that the underfloor transformer can be carried suspended therefrom given an approximately horizontally oriented limb axis.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
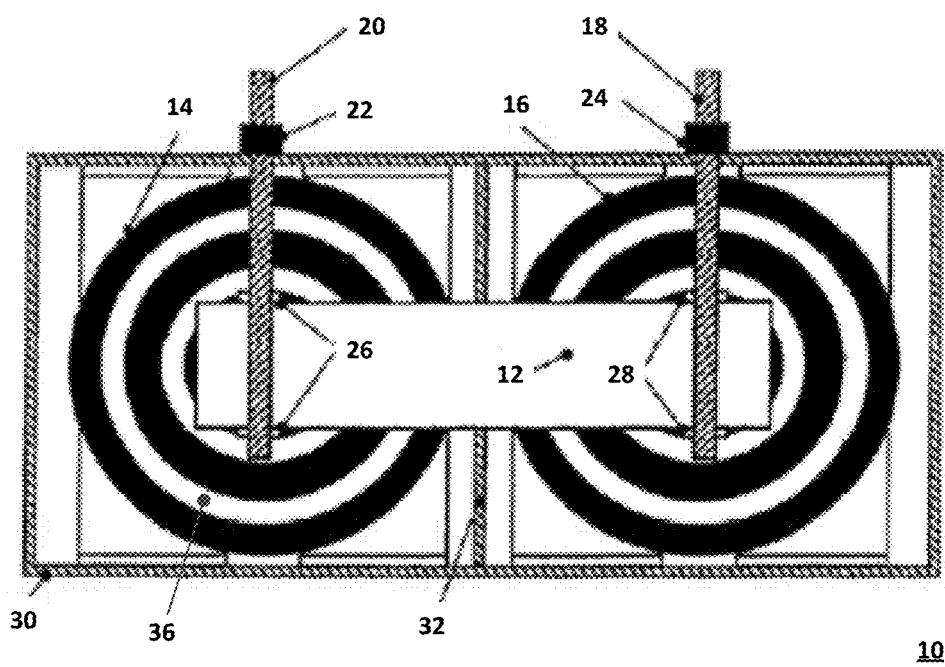
FIG. 1 shows a section through an underfloor transformer according to an exemplary embodiment of the present disclosure.

In view of the background mentioned above, exemplary embodiments of the present disclosure provide a dry transformer which can be arranged in a lying position for mobile applications.

Exemplary embodiments of the present disclosure provide a dry transformer which includes a layered transformer core having two axial end regions, and at least one electrical winding through which the transformer core extends along a limb axis. In addition, the exemplary underfloor transformer includes securing devices each respectively provided in a corresponding one of each of the two axial end regions of the transformer core. The securing devices interact with the transformer core mechanically, and are configured for tensile force stressing such that the underfloor transformer can be carried suspended therefrom given an approximately horizontally oriented limb axis.

Exemplary embodiments of the present disclosure provide the underfloor transformer for a suspended arrangement, wherein the securing devices engage directly on the two axial ends of the transformer core and transmission of the core weight via the at least one electrical winding through which the transformer core extends along the limb axis is avoided. Given a lying arrangement, the hollow cylindrical winding is in fact otherwise to be provided in a radial direction for compressive loading, for example, in a vertical downward direction when the winding is arranged in a lying installation position. For example, the cooling ducts which are provided along the limb axis in the case of standing dry transformers are not able to cope with weight loading of, for example, up to several tonnes because, due to a standing arrangement, only the winding's own weight has to be transmitted via the winding, in which case the cooling ducts are then oriented perpendicularly and ultimately not subject to any weight loading.

According to an exemplary embodiment of the underfloor transformer according to the present disclosure, adjacent layers of the layered transformer core are bonded to one another along at least one limb axis. Given a corresponding elongate embodiment of the core of the underfloor transformer according to the present disclosure, it is possible for bending of the core limbs to occur given suspension at the two axial core ends, which bending is caused both by the transformer core's own weight and by the weight of the winding. The layered embodiment of the transformer core causes its loadability in the transverse direction with respect to the limb axis to be reduced in a lying arrangement, as compared to a solid core, wherein, on the other hand, lamination of the core in order to avoid eddy current losses is unavoidable. Bonding of adjacent lamination layers, for example, in the region of the transformer limbs increases the mechanical stability of the limb. In the case of bonding of all the lamination layers to one another, the loadability of the transformer limb then corresponds approximately to that of a solid, non-laminated embodiment. As a result, even elongate embodiments of the underfloor transformer according to the disclosure, for example with a core length which corresponds to 3 to 6 times the core width, can be advantageously implemented without a bending problem.

A further possibility according to the present disclosure for stabilizing the transformer core, for example, the limbs thereof, is that the layered transformer core has at least one stabilizer plate along at least one limb axis. The stabilizer plate has a thickness which is increased compared to the core lamination, for example 3 to 10 times the thickness thereof or several millimeters. Depending on the selection of the material of the stabilizer plate, eddy currents also occur there but, on the other hand, they can virtually be ignored owing to the small portion of the limb cross section taken up by the stabilizer plate. However, non-magnetic and electrically non-conductive materials, such as, for example, composite materials which are advantageously distinguished by a low weight, are also conceivable, which is advantageous, for example, in the case of mobile applications.

In the case of electrically conducting materials, steel or aluminium, for example, can be used as the starting material for the stabilizer plate, wherein steel has an increased strength and aluminium has a relatively low weight. In order to utilize the available limb cross section as much as possible, the at least one stabilizer plate adjoins the outer boundary of the layered transformer core. Further stabilization of a core limb is made possible by bending of the at least one stabilizer plate about the limb axis. Similarly to profile carriers, this increases the effective thickness of the stabilizer plate and therefore the flexural strength thereof. Additional bonding of the stabilizer plate to the actual transformer core or transformer limb also provides further increased strength here.

According to an exemplary embodiment of the present disclosure, the stabilizer plate is fabricated from a material with a spring characteristic, for example, from a spring steel. The stabilizer plate which is fabricated therefrom is curved up along the limb axis in the unloaded state. The spring constant is selected in such a way that given an arrangement of the core limb on the surface thereof the stabilizer plate is pressed into the horizontal as a result of the core limb's own weight. Such prestressing of the stabilizer plate achieves an additional supporting effect and also damping effect against shocks.

According to an exemplary embodiment of the underfloor transformer according to the present disclosure, at least one layer with a resin-impregnated fibre roving is wound around at least one core limb. For example, a strip-like glass fibre roving is possible as the fibre roving, and an epoxy resin is possible as the resin. In the hardened state, the glass fibre roving which is impregnated with resin forms a composite material with a high strength which ideally encloses the respective core limb along its entire axial extent and therefore gives it a high strength. A thin layer of, for example, 1 mm in thickness is advantageously sufficient to achieve a sufficiently high strength, such that the magnetically usable core cross section is not significantly reduced. In addition, such composite materials are distinguished by a low weight.

According to an exemplary embodiment of the present disclosure, the at least one securing device has a damping element. This is advantageous, for example, for use in mobile applications in railway vehicles, for example. Owing to the locomotion of the rail vehicle, jolt-like or shock-like movements frequently occur and are transmitted via the securing devices to the underfloor transformer. As a result of the dampers, the impact loading for the transformer and for the securing devices is reduced, and the transformer can be configured for correspondingly lower mechanical stress. For example, elements made of an elastic plastic or rubber are suitable as dampers. They can be arranged in such a way that they are subject either to compressive or tensile stress. If the securing devices are designed, for example, as threaded rods from which the transformer core is attached suspended by means of a clamping device, a damper element can easily be integrated into an interruption point of the respective threaded rod, with the result that the latter is then subjected to tensile stress.

According to an exemplary embodiment of the present disclosure, the transformer core extends through a plurality of axially adjacent electrical windings along a limb axis, wherein at least one further securing device which interacts with the transformer core is provided between adjacent windings. As a result of the axially adjacent arrangement of a plurality of respective hollow-cylinder winding segments on the same core limb, a mechanical engagement possibility on the respective core limb is provided given corresponding axial spacing. The axial spacing is to be selected according to the disclosure such that a securing device which interacts with the transformer limb can be arranged in the gap of, for example, 5 cm to 10 cm which has been produced in this way. As a result, a further load support point for the transformer limb is provided, which load support point is then supported, for example, like the load support points at the two axial ends of the core, by a carrying structure which is located above them. The bending stress for the transformer limb is advantageously reduced as a result. Of course, a plurality of additional load support points are also possible per each transformer limb. If an electrical winding is formed from a plurality of winding segments, a suitable electrical embodiment should be selected, for example a series circuit of over-voltage winding segments of the same type and a parallel circuit of a plurality of under-voltage segments of the same type.

According to an exemplary embodiment of the present disclosure, winding segments can also be readily divided up among a plurality of core limbs, for example among two or else three, wherein the core limbs or the limb axes thereof are then preferably oriented parallel. This results in a square-like basic shape of the underfloor transformer, which shape likewise corresponds to the square-like space available in the underfloor region of a vehicle with the result that the available space is utilized in a particularly effective way.

The specified advantages of an underfloor transformer according to the present disclosure also relate to a rail vehicle which has an underfloor region in which an underfloor transformer according to present disclosure is arranged suspended from a carrying structure located above it. Of course, this also applies to non-rail-bound vehicles such as overhead line buses or the like.

FIG. 1 shows a section through an underfloor transformer 10 according to an exemplary embodiment. The transformer 10 includes a horizontally arranged transformer core 12 with a total of two limbs, around which a first hollow cylindrical winding 14 and a second hollow cylindrical winding 16 are arranged. The windings 14, 16 each have three hollow cylindrical winding segments which are interleaved one in the other and spaced apart radially by cooling ducts 36. The transformer core 12 is secured suspended at its one axial end by means of two securing devices 18, 20, wherein at its other axial end two corresponding securing devices are also provided but are not shown in this drawing. The securing devices 18, 20 are embodied, for example, as threaded rods which are guided at their lower end through a corresponding drilled hole-like cutout through the transformer core 12 which is embodied in a laminated fashion, for example. A frictionally locking connection of the threaded rods 18, 20 to the transformer core 12 is implemented by means of two clamping devices 26, 28 which clamp in the transformer core 12 between its upper side and lower side in the manner of a check nut. The transformer is arranged in a square-like housing 30 which serves, on the one hand, to provide mechanical protection to the transformer and, on the other hand, to also guide cooling air along the windings 14, 16. A corresponding cooling system is, however, not shown in this drawing. In this example, a dividing wall 32 is arranged between the left-hand and right-hand transformer halves, wherein in the rear region which is not shown a transition is provided between the ducts which are formed in this way, with the result that U-shaped guidance of the cooling air through the transformer housing 30 is brought about. The weight of the transformer core or of the coil is not transmitted via the housing 30.

Figure 2:
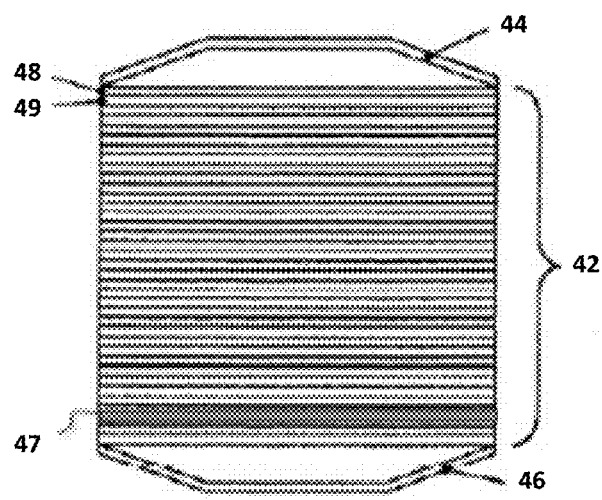
FIG. 2 shows a cross section through a layered transformer limb according to an exemplary embodiment of the present disclosure.

FIG. 2 shows a cross section 40 through a layered transformer limb 42 which has, for its part, a multiplicity of electrically insulated laminations which are arranged in core layers 48, 49. An aluminium stabilizer plate 44 which is bent about the limb axis of the transformer limb 42, and which is bonded to the transformer limb 42, is provided on the upper side of the transformer limb 42. As a result of the bending of the stabilizer plate 44, a profile is formed which gives the stabilizer plate 44, and therefore also the transformer limb 42 connected thereto, increased stability against bending. A corresponding stabilizer plate 46 is provided on the lower side. The curved shape of the stabilizer plates 44, 46 fits into the hollow cylindrical interior space of a winding which surrounds the transformer limb 40 such that no relevant loss of active core cross-sectional area results from the stabilizer plates 44, 46. As shown in FIG. 2, at least one layer 47 with a resin-impregnated fibre roving can be wound around the transformer limb 42.

Figure 3:
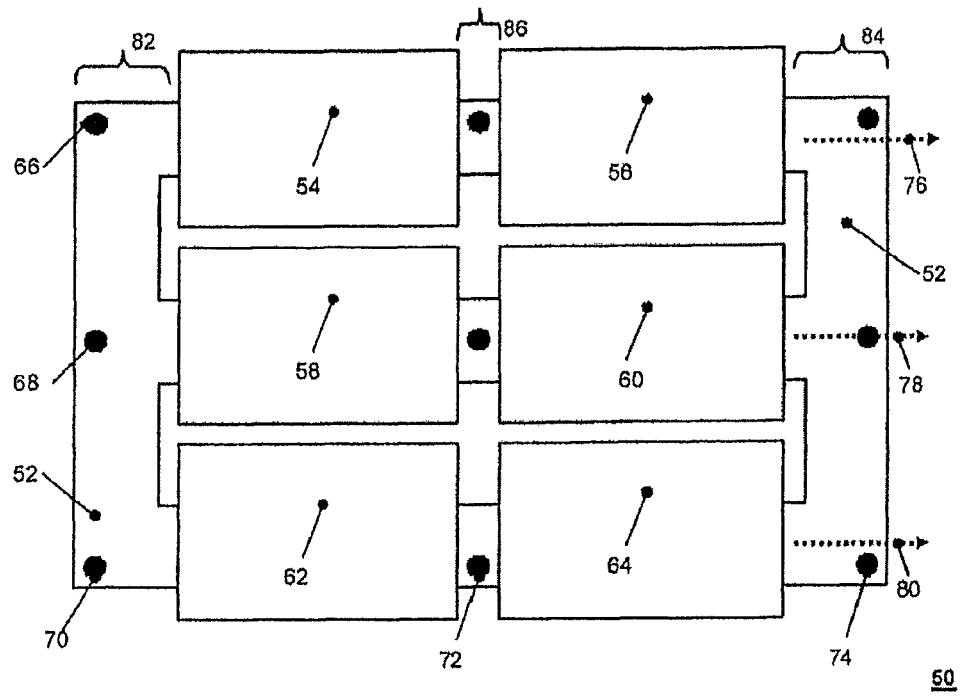
FIG. 3 shows a plan view of an underfloor transformer according to an exemplary embodiment of the present disclosure.

FIG. 3 shows a plan view of an underfloor transformer 50 in a lying position, according to an exemplary embodiment of the present disclosure. The underfloor transformer 50 has a transformer core 52 with a total of three parallel core limbs running along respective limb axes 76, 78, 80. On each core limb, in each case two adjacent hollow cylindrical windings 54, 56, 58, 60, 62, 64, through which the core limb extends, are arranged, wherein a gap-like axial intermediate region 86, at which mechanical access to the transformer core 52 is made possible, is formed between the respective winding pairs. At the likewise mechanically accessible axial end regions 82, 84 of the transformer core, in each case three securing device parts 66, 68, 70, 72, 74, to which the transformer core 52 is to be attached in a suspended fashion, are also provided as in the axial intermediate region 86. The securing device parts 66, 68, 70, 72, 74 are embodied in a rod-like fashion and are guided through respective drilled holes, adapted thereto in cross section, through the transformer core and mechanically connected thereto, for example, with a disc-like thickened portion of the securing device parts 66, 68, 70, 72, 74 which are embodied in the manner of rods, in their respective lower region. A locking device is optionally provided on the upper side of the transformer core 52.

Figure 4:
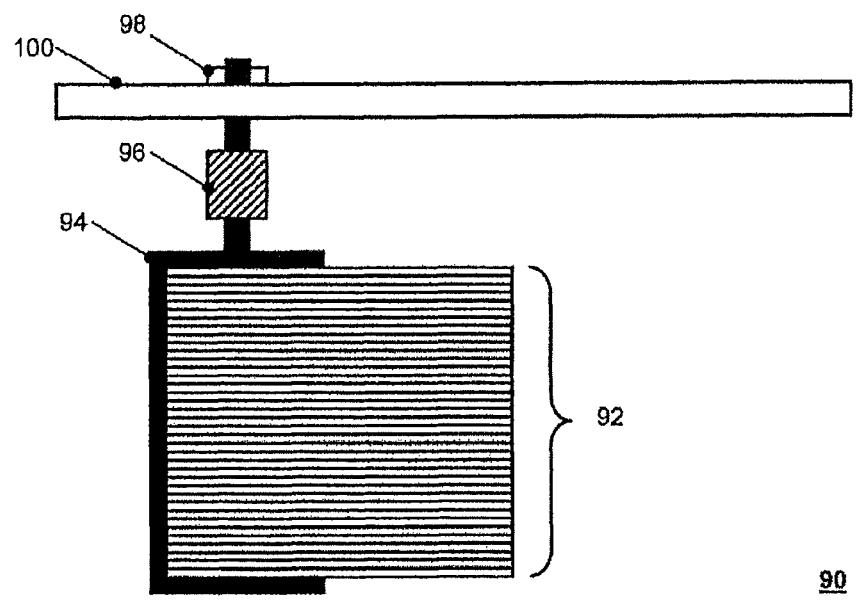
FIG. 4 shows a section through a first core region with a securing device according to an exemplary embodiment of the present disclosure.

FIG. 4 shows a section 90 through a first exemplary core region 92 with a securing device 94. In this section, the transformer core is attached suspended from a carrying structure 100. The securing device 94 has a damper 96 which can be subjected to tensile loading and which is fabricated, for example, from a slightly elastic plastic. The connection between the securing structure 94 which is embodied in the manner of a threaded rod and the carrying structure is provided in this case by means of a drilled hole through which the threaded rod is guided, and a securing device 98, for example, a nut, which is attached to the threaded rod. The securing device 98 is embodied in a U shape in its lower region, clamps in the laminations of the core region cross section 92 which is shown, and in this way forms a frictionally locking connection to the transformer core.

Figure 5:
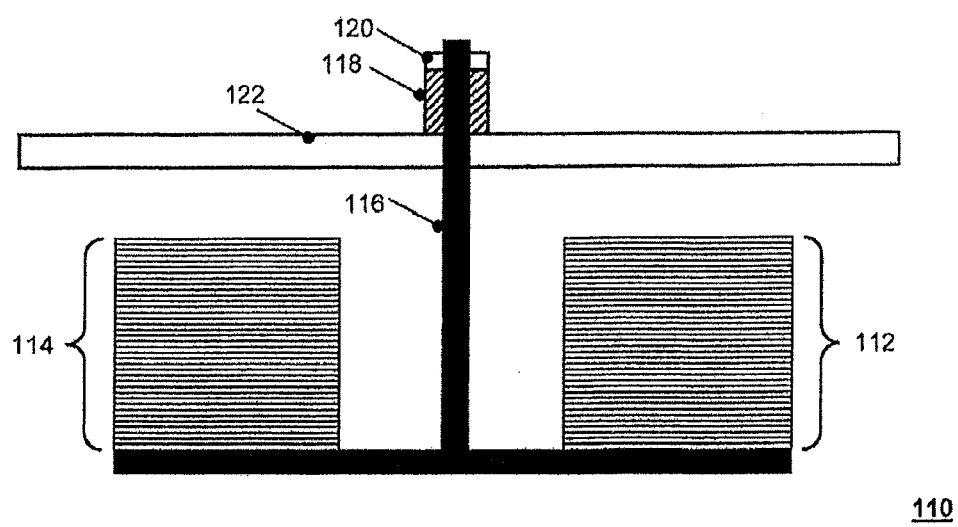
FIG. 5 shows a section through a second core region with a securing device according to an exemplary embodiment of the present disclosure.

FIG. 5 shows a section 110 through a second exemplary core region 112, 114 with a suspended securing device 116 which is embodied in a T shape, and which supports from below in each case the core limbs 112, 114 on its two T bars. Such an example of a securing device 116 is advantageous, for example, in axially divided windings, wherein additional support of the core limbs is provided here in the axial intermediate region between the adjacent windings. The T-shaped securing device 116 is guided in its upper region through a drilled hole in a carrying structure 122, for example, a floor part of a rail vehicle, which is located above the transformer core, the securing device 116 being secured there by means of an attachment means 120. A pressure-loadable damper 118 is provided between the attachment means 120 and the upper side of the carrying structure 122, which damper 118 advantageously damps the transmission of impacts from the carrying structure 122 to the transformer core, as a result of which, the transformer and its securing structure 116 are mechanically relieved, for example, even in the case of unavoidable vibrations of the rail vehicle. Likewise, transmission of, for example, operationally induced 50 Hz vibrations of the transformer to the rail vehicle is also damped.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMBERS

10 Section through an exemplary underfloor transformer
12 First transformer core
14 First winding of the first transformer core
16 Second winding of the first transformer core
18 First securing device of the first transformer core 20 Second securing device of the first transformer core
22 Damper of first securing device
24 Damper of second securing device
26 Clamping device of first securing device
28 Clamping device of second securing device
30 Transformer housing
32 Dividing wall
40 Cross section through a layered transformer limb
42 Layered transformer limb
44 Upper stabilizer plate
46 Lower stabilizer plate
48 First core layer
49 Second core layer
50 Plan view of a second exemplary underfloor transformer
52 Second transformer core
54 First winding of second transformer core
56 Second winding of second transformer core
58 Third winding of second transformer core
60 Fourth winding of second transformer core
62 Fifth winding of second transformer core
64 Sixth winding of second transformer core
66 First part of first securing device
68 Second part of first securing device
70 Third part of first securing device
72 First part of second securing device
74 First part of third securing device
76 First limb axis
78 Second limb axis
80 Third limb axis
82 First axial end region
84 Second axial end region
86 Axial intermediate region
90 Section through first exemplary core region with securing device
92 Transformer core yoke
94 First securing device
96 Damper of first securing device
98 First attachment means
100 First carrying structure
110 Section through second exemplary core region with securing device
112 First transformer core limb
114 Second transformer core limb
116 Second securing device
118 Damper of second securing device
120 Second attachment means
122 Second carrying structure

What is claimed is:

1. An underfloor transformer comprising:
a layered transformer core having two axial end regions and a plurality of limbs which each extend horizontally in a parallel arrangement and are stacked on top of each other;
at least one electrical winding through which the transformer core extends along a limb axis, the at least one electrical winding comprising at least one cooling duct for guiding a coolant along the at least one electrical winding; and
securing devices each respectively provided in a corresponding one of each of the two axial end regions of the transformer core,
wherein the securing devices are configured to interact mechanically with the transformer core, and are configured for tensile force stressing such that the underfloor transformer can be carried suspended from the securing devices given an approximately horizontally oriented limb axis, and the securing devices having at least one suspension device configured to support the entire weight of the suspended underfloor transformer below the at least one suspension device,
wherein the underfloor transformer is configured to supply energy to a rail vehicle, and
wherein the transformer core is a unitary structure which extends undivided along the limb axis between the securing devices.

2. The underfloor transformer according to claim 1, wherein adjacent layers of the layered transformer core are bonded to one another along at least one limb axis.

3. The underfloor transformer according to claim 1, wherein the layered transformer core has at least one stabilizer plate along at least one limb axis.

4. The underfloor transformer according to claim 3, wherein the at least one stabilizer plate is one of a steel plate and an aluminium plate.

5. The underfloor transformer according to claim 3, wherein the at least one stabilizer plate adjoins an outer boundary of the layered transformer core.

6. The underfloor transformer according to claim 5, wherein the at least one stabilizer plate is bent about a limb axis.

7. The underfloor transformer according to claim 5, wherein the at least one stabilizer plate is bent along a limb axis.

8. The underfloor transformer according to claim 3, wherein the stabilizer plate is bonded, at least in certain regions, to the layered transformer core.

9. The underfloor transformer according to claim 1, wherein at least one layer with a resin-impregnated fibre roving is wound around at least one limb.

10. The underfloor transformer according to claim 1, wherein at least one securing device has a damping element.

11. The underfloor transformer according to claim 1, wherein the transformer core extends through a plurality of axially adjacent electrical windings along a limb axis, and
wherein at least one further securing device which interacts with the transformer core is arranged between adjacent windings.

12. The underfloor transformer according to claim 1, comprising:
a plurality of parallel limb axes.

13. A rail vehicle, comprising:
an underfloor region in which an underfloor transformer according to claim 1 is arranged suspended from a carrying structure located above the underfloor transformer.

14. The underfloor transformer according to claim 2, wherein the layered transformer core has at least one stabilizer plate along at least one limb axis.

15. The underfloor transformer according to claim 14, wherein the at least one stabilizer plate is one of a steel plate and an aluminium plate.

16. The underfloor transformer according to claim 15, wherein the at least one stabilizer plate adjoins an outer boundary of the layered transformer core.

17. The underfloor transformer according to claim 16, wherein the at least one stabilizer plate is bent about a limb axis.

18. The underfloor transformer according to claim 17, wherein the stabilizer plate is bonded, at least in certain regions, to the layered transformer core.

19. The underfloor transformer according to claim 16, wherein the at least one stabilizer plate is bent along a limb axis.

20. The underfloor transformer according to claim 19, wherein the stabilizer plate is bonded, at least in certain regions, to the layered transformer core.

\* \* \* \* \*